(12) United States Patent
Sawada et al.

(10) Patent No.: US 6,439,560 B2
(45) Date of Patent: Aug. 27, 2002

(54) POSITIONING AND CLAMPING APPARATUS

(75) Inventors: Ken Sawada; Akio Nakata; Masakazu Tetsuka, all of Tokyo (JP)

(73) Assignee: Koganei Corporation, Tokyo (JP)

( * ) Notice: Subject to any disclaimer, the term of this patent is extended or adjusted under 35 U.S.C. 154(b) by 0 days.

(21) Appl. No.: 09/783,193

(22) Filed: Feb. 14, 2001

(30) Foreign Application Priority Data

Feb. 15, 2000 (JP) ........................................ 2000-036322

(51) Int. Cl.$^7$ ................................................ B23Q 3/08
(52) U.S. Cl. ........................................... 269/32; 269/49
(58) Field of Search .............................. 269/32, 49, 233

(56) References Cited

U.S. PATENT DOCUMENTS

| | | | | |
|---|---|---|---|---|
| 4,618,131 A | * | 10/1986 | Campisi et al. ................ | 269/32 |
| 5,490,663 A | * | 2/1996 | Stojkovic et al. .............. | 269/32 |
| 6,102,383 A | * | 8/2000 | Tunkers ........................ | 269/49 |

FOREIGN PATENT DOCUMENTS

JP 09-144715 6/1997

* cited by examiner

Primary Examiner—Robert C. Watson
(74) Attorney, Agent, or Firm—McCormick, Paulding & Huber LLP (57) ABSTRACT

A clamp jig has a positioning pin provided at the tip of a cylindrical member, and a clamp arm is mounted in a slit formed in this positioning pin, so as to be able to swing and so as to be able to axially advance and retreat. A reciprocating shaft is connected to the clamp arm by a connecting pin, and a spring force is applied to this reciprocating shaft in a retreating direction by a compression coil spring. A plunger 35 brought into contact with the reciprocating shaft is mounted in a drive housing so as to be able to axially reciprocate, and a female screw member driven by a motor is thread-connected to a male screw member secured to this plunger. Accordingly, it is made possible to reliably perform positioning and clamping, of a member to be fixed, and unclamping thereof by a low-cost motor.

8 Claims, 5 Drawing Sheets

POSITIONING AND CLAMPING APPARATUS

TECHNICAL FIELD OF THE INVENTION

The present invention relates to a positioning and clamping apparatus that positions and fixes in a predetermined position a member to be fixed such as a panel constituting a vehicle body.

BACKGROUND OF THE INVENTION

Vehicle bodies are manufactured by joining a plurality of panels by means of welding means such as spot welding. In the case of welding thin iron plates, such as panels constituting the vehicle body, it is necessary to position these panels in predetermined positions and clamp the panels. Conventionally, a clamping device as described in, for example, Japanese Patent Laid-Open Publication (JP-A) No. 9-144715 has been used.

This clamping device uses air pressure as a driving force for driving a clamp arm, and in addition to the air pressure piping for supplying compressed air into a pneumatic cylinder, an electric wiring is provided with respect to a sensor for detecting that a piston is in a predetermined position. Therefore, it is necessary to let the air pressure piping and the electric wiring creep about the clamping device. In particular, when panels constituting the vehicle body are fixed, it is necessary to use a multiplicity of clamping devices for fixing one panel, and to let the air pressure piping and the electric wiring creep about the clamping device in a complicated manner.

On the other hand, it has been studied to use an electric motor as a driving force for the clamp arm. However, in case that a screw member is axially moved by the motor and that this axial motion is converted into the opening/closing motion of the clamp arm to thereby operate the clamp arm, the current value of the motor should be detected or a load applied on the motor should be detected, using a load cell, in order to prevent overloading of the clamp arm from occurring, by controlling the ON/OFF of the motor. Accordingly, a loop control having a feedback function must be employed as a control system of the motor, and as a result, the clamping device becomes expensive.

If the control of the motor which opens/closes the clamp arm can be performed by an open loop control, it becomes possible to open/close the clamp arm by a low-cost motor including a control section.

SUMMARY OF THE INVENTION

It is an object of the present invention to make it possible to reliably perform positioning and clamping of a member to be fixed, and unclamping thereof by a low-cost motor.

According to a first aspect of the present invention, there is provided a positioning and clamping apparatus comprising: a support barrel having a supporting face formed thereon for supporting a member to be fixed and provided with a positioning pin to which a positioning hole formed on the member to be fixed is fitted; a clam arm mounted in a slit formed in the positioning pin so as to be able to swing and so as to be able to move axially in an advancing/retreating direction, and having a clamp jaw provided at a tip thereof for clamping the member to be fixed between the supporting face and the clamp jaw; a drive housing mounted to a rear end portion of the support barrel, and having a reciprocating shaft connected to the clamp arm so as to be able axially reciprocate; a spring member provided in the drive housing, for applying a spring force to the clamp arm in a retreating direction via the reciprocating shaft; a plunger mounted in the drive housing so as to be able to reciprocate and brought into contact with the reciprocating shaft; and a motor mounted to a rear end portion of the drive housing and provided with a rotor connected in a threading manner to a male screw member secured on the plunger.

According to a second aspect of the invention, a retreating stroke end of the plunger is set to be rearward of a retreating stroke end of the reciprocating shaft. Also, according to a third aspect of the invention, a female screw is formed on a hollow rotation shaft provided in the motor, and the male screw member is connected to the rotation shaft in a threading manner. Furthermore, according to a fourth aspect of the invention, the male screw transmits a rotating motion of the rotor in the axial direction of the male screw member, and has a lead angle such that the rotor is not rotated by an axial thrust of the male screw member.

According to the present invention, when positioning and clamping of a member to be fixed is performed by a motor, the member to be fixed is clamped by a spring force, at the time of clamping. Therefore, clamping or unclamping of the member to be fixed can be performed, using a small motor as a driving force, without causing overloading of the clamp arm. The length of the device can be also made short, by making the rotation shaft of the motor a hollow shaft. The length of the device can be made shorter, by providing a female screw in the hollow shaft, which is thread-connected to the male screw member, enabling achievement of a small device. Moreover, the plunger is thread-connected to the rotor via the male screw member, in such a manner that the male screw member moves axially only when the rotor rotates, and even if an axial thrust is applied to the male screw member, rotation of the rotor can be prevented.

DESCRIPTION OF THE PREFERRED EMBODIMENTS

Embodiments of the present invention will be described below with reference to drawings.

Figure 1:
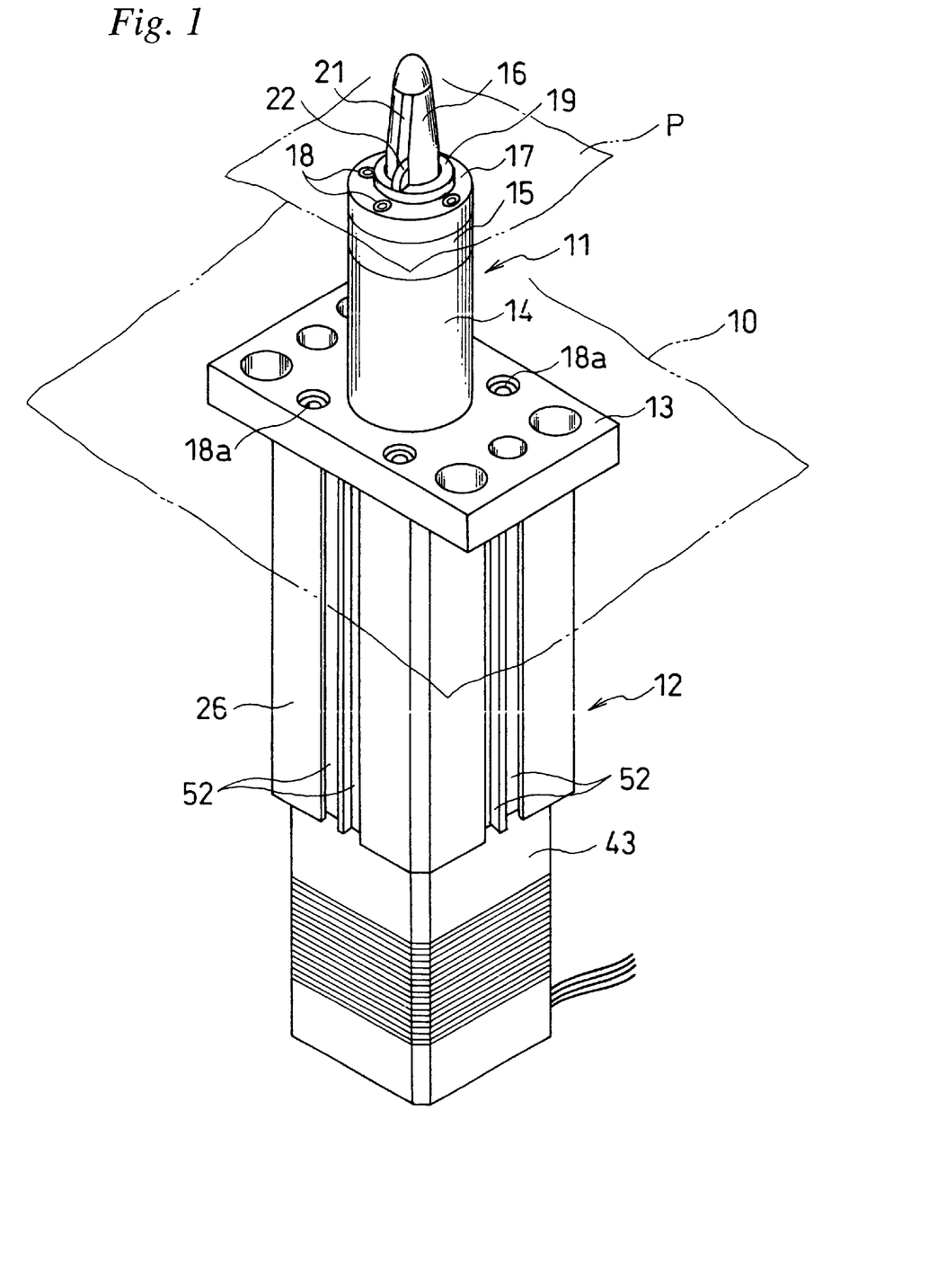
FIG. 1 is a perspective view showing a positioning and clamping apparatus, according to an embodiment of the present invention.
Figure 2:
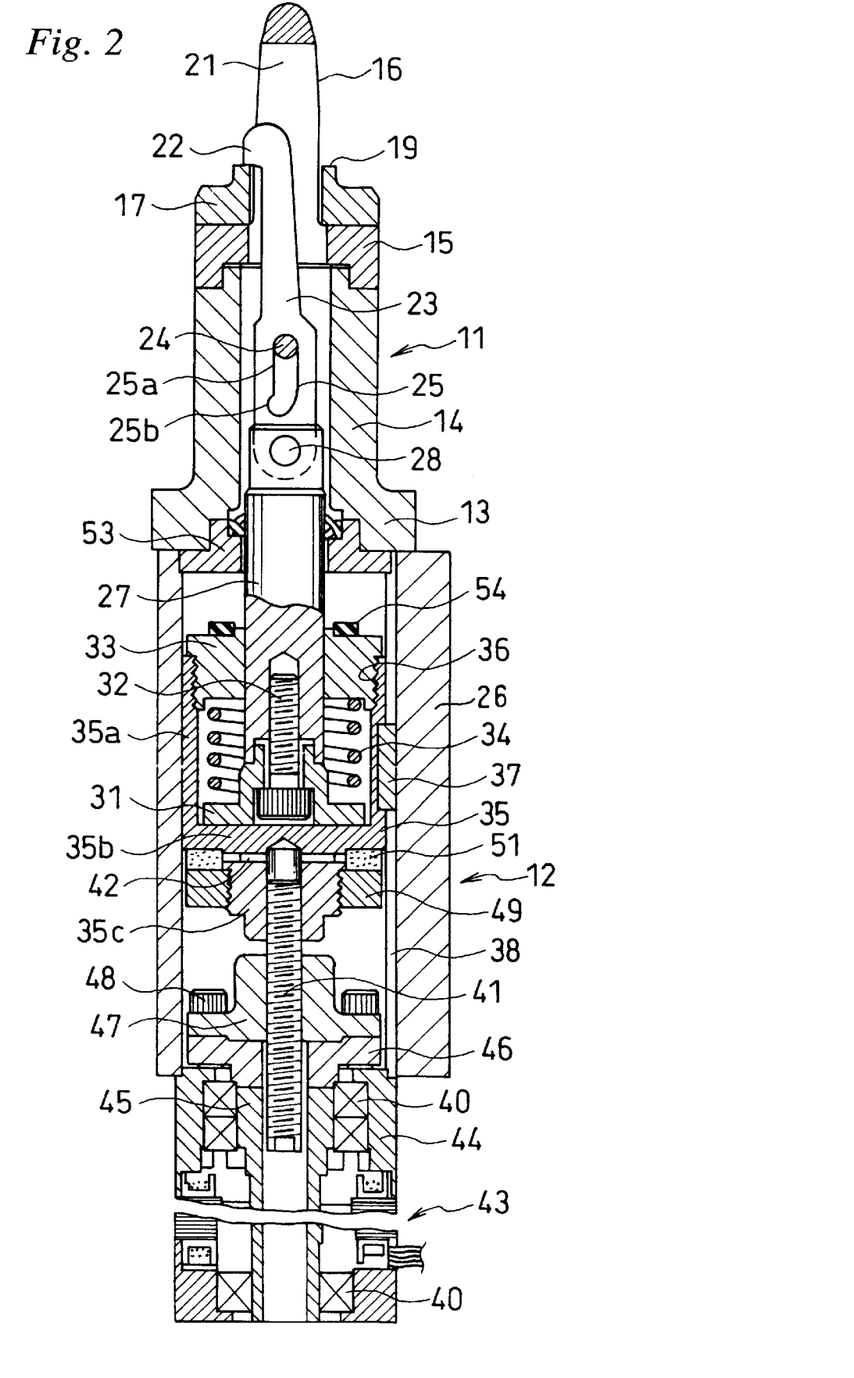
FIG. 2 is an enlarged sectional view of FIG. 1, with a part thereof being omitted.

FIG. 1 is a perspective view showing the entire positioning and clamping apparatus, which is one embodiment of the present invention. FIG. 2 is an enlarged sectional view of FIG. 1, with a part thereof being omitted.

This positioning and clamping apparatus has a clamp jig 11 fixed on a support stand 10 and a drive mechanism 12 mounted to this clamp jig 11. The positioning and clamping apparatus is used for positioning a panel P as a member to be fixed, and clamping the panel P. The positioning and clamping apparatus shown in FIG. 1 is arranged by an optional number on a stage where the panel P is clamped, depending on the size of the panel P.

The clamping jig 11 has a cylindrical member 14 provided with a rectangular pedestal portion 13 at rear end thereof, and a positioning pin 16 integrated with a circular flange 15 is arranged at a tip portion of the cylindrical member 14, with the positioning pin 16 mounted to the cylindrical member 14 by a cap 17. In order to mount the cap 17 and the positioning pin 16 to the cylindrical member 14, bolts 18 connected to the cylindrical member 14 through the flange 15, in a threading manner are provided in the cap 17, as shown in FIG. 1.

An end face of the cap 17 serves as a supporting face 19 for supporting a panel P which is a member to be fixed, so that the cap 17 and the cylindrical member 14 form a support barrel provided with a positioning pin 16 to which a positioning hole formed in the panel P is fitted.

A slit 21 is formed in the positioning pin 16 up to the rear end face, leaving the tip end portion thereof, and a clamp arm 23 having a clamp jaw 22 provided at the tip thereof is provided in the slit so as to be able to move axially in the advancing or retreating direction, and to be able to swing such that the clamp jaw 22 is protruded from or retracted in the slit 21 radially. The cylindrical member 14 is fixed with a securing pin 24 facing the radial direction, with the securing pin 24 piercing through a cam groove 25 formed in the clamp arm 23. The cam groove 25 has a straight section 25a on a tip side and a ramp section 25b on a rear end side, so that, as shown in FIG. 2, when the clamp arm 23 is retracted toward the rear end portion of the cylindrical member 14, the clamp jaw 22 protrudes outward of the positioning pin 16 from the slit 21, and on the contrary, when the clamp arm 23 is pushed forward toward the tip portion, the securing pin 24 goes into the ramp section 25b, so that the clamp arm 23 goes into the slit 21 and housed therein.

The drive mechanism 12 has a drive housing 26 having a substantially square outer periphery, and this drive housing 26 is mounted to a flange 13 of the cylindrical member 14 by bolts 18a, at the end face thereof. A reciprocating shaft 27 is housed in the drive housing 26 so as to be able to reciprocate axially, and the clamp arm 23 is connected at the rear end thereof to a portion of the reciprocating shaft 27 by a connecting pin 28, which is in parallel with the securing pin 24, so that the clamp arm 23 can freely swing about the connecting pin 28.

A spring bearing member 31 is mounted to the rear end portion of the reciprocating shaft 27 by a bolt 32, and a compression coil spring 34 is accommodated between a sliding ring 33 and the spring bearing member 31, which sliding ring 33 is axially slidably mounted on the reciprocating shaft 27.

A plunger 35 is mounted in the drive housing 26 so as to be able to reciprocate axially. This plunger 35 has a cylindrical portion 35a on which a female screw portion 36 is formed for being thread-connected to a male screw portion of the sliding ring 33, and an end plate portion 35b integrated therewith. A screw fitting portion 35c is integrally provided on the end plate portion 35b, so that the end face of the spring bearing member 31 is brought into contact with the inner face of the end plate portion 35b. A key 37 is mounted on the outer periphery of the cylindrical portion 35a, protruding radially outwards, so that the plunger 35 reciprocates axially, without rotating in the drive housing 26, and a key way 38 for the key 37 to come into is formed on the inner periphery of the drive housing 26 along the axial direction.

A male screw member 41 is secured in the screw fitting portion 35c of the plunger 35 by a locking pin 42, so as to protrude rearwards. A stepping motor 43 is mounted to the rear end portion of the drive housing 26. A nut, i.e., a female screw member 47 is secured by bolts 48 on a hollow rotation shaft 45, which is rotatably provided by bearings 40 in a housing 44 of this motor 43, via a rotation ring 46, with the female screw member 47 thread-connected to the male screw member 41.

Therefore, when the stepping motor 43 is energized to rotate the rotation shaft 45, the male screw member 41 moves axially without rotating, to thereby drive the plunger 35 axially. It is also possible to drive the plunger 35, even when the rotation shaft 45 is not a hollow shaft. That is to say, a hollow rotation shaft 45 is built in the motor 43, such that when the plunger 35 moves so as to retreat, the male screw member 41 comes into the hollow hole in the rotation shaft 45. As a result, the overall length of the drive housing 26 can be made short.

A permanent magnet 51 is mounted to the plunger 35 by a nut 49, which is thread-connected to the screw fitting portion 35c thereof. A magnetic sensor sensitive to the magnetic force of the magnet 51 is mounted to a sensor mounting groove 52, which is formed on the outer periphery of the drive housing 26, as shown in FIG. 1. As a result, it can be detected that the plunger 35 moves to a position at the advancing stroke end and a position at the retreating stroke end. The sensor mounting groove 52 may be formed on two, three or four faces, so long as it is formed at least one face of the four faces of the drive housing 26 having a square outer periphery. By providing the sensor mounting grooves 52 on a plurality of faces, it becomes possible to optionally set the position where the sensor is mounted, depending on a place where the apparatus is installed.

As described above, since the position at the advancing stroke end of the plunger and the position at the retreating stroke end thereof are detected by the sensor, the control of the motor 43 can be performed by the open control, without having the feedback function. As a result, an inexpensive motor can be used as the motor 43, including the control section. Even if a plurality of positioning and clamping apparatuses are installed on one panel positioning stage, a low-cost stage can be used.

A rod cover 53 is provided, as shown in FIG. 2, at the tip portion of the drive housing 26, and at the tip face of the sliding ring 33, there is secured a shock absorbing member 54 that is brought into contact with the inner face of the rod cover 53, when the reciprocating shaft 27 comes to the advancement limiting position. This shock absorbing member 54 is formed of rubber or synthetic resin.

FIG. 2 shows a situation where the plunger 35 is moved to retreat until the clamp jaw 22 of the clamp arm 23 is directly brought into contact with the supporting face 19, without arranging the panel P on the clamp jig 11.

Figure 3:
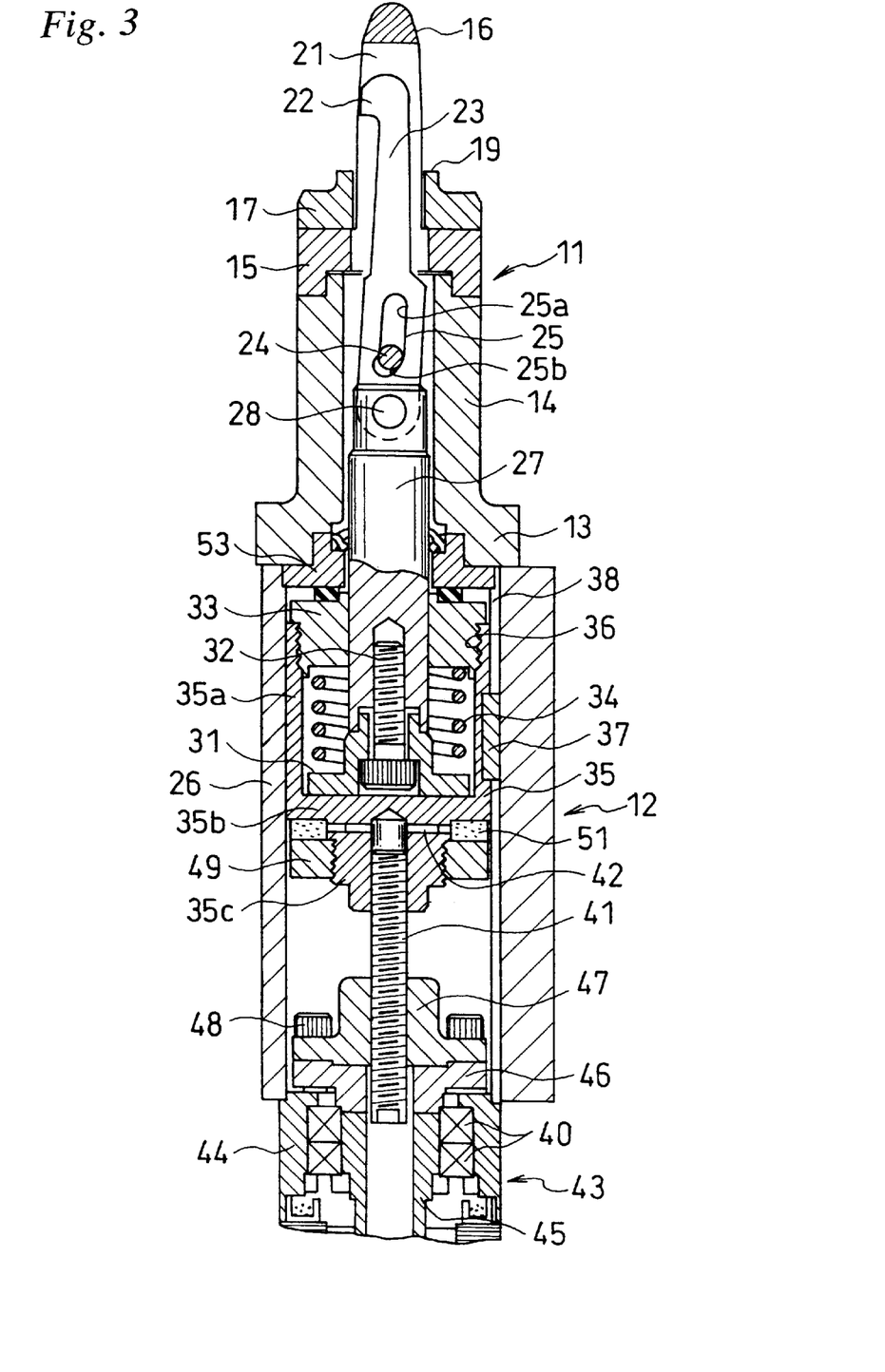
FIG. 3 is a sectional view showing the similar portion to that of FIG. 2, showing an unclamping state of a clamp arm.

FIG. 3 shows a situation where the plunger 35 is driven up to the advancement limiting position. At this time, the clamp arm 23 is pushed forward by the reciprocating shaft 27, and the securing pin 24 comes into the ramp section 25b, so that the clamp arm 23 moves forward, while swinging, to thereby come into the slit 21. Under this situation, the panel P is arranged on the clamp jig 11, and the positioning pin 16 is inserted into a positioning hole H provided in the panel P. As a result, positioning of the panel P can be performed with respect to the support stand 10 on which the clamp jig 11 is disposed.

Then, when the plunger 35 is moved so as to retreat by the motor 43, the clamp jaw 22 protrudes outwards from the slit 21, while moving so as to retreat, to thereby clamp, that is, fasten the panel P between the clamp jaw 22 and the supporting face 19.

Figure 4:
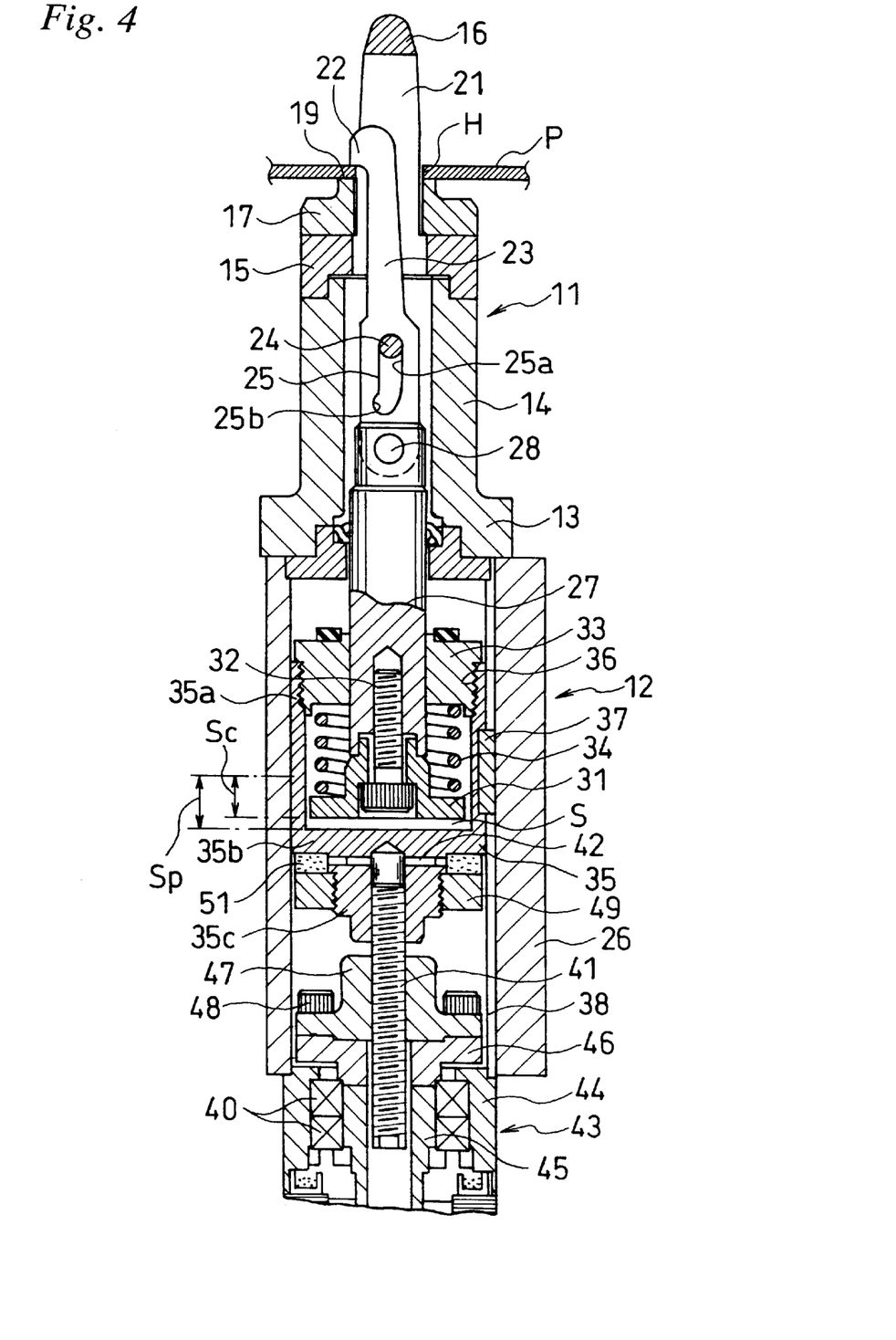
FIG. 4 is a sectional view showing the similar portion to that of FIG. 2, showing a state that a member to be fixed is clamped by a clamp arm.

FIG. 4 is a sectional view showing a state that the panel P is clamped by the clamp jaw 22, wherein the clamp arm 23 and the reciprocating shaft 27 are in the retreat limiting position, since the clamp jaw 22 is brought into contact with the panel P. On the other hand, when the plunger 35 moves to the position at the retreating stroke end, the plunger 35 is in a position away from the spring bearing member 31, to thereby form a gap S between the contact face of the spring bearing member 31 and the contact face of the end plate portion 35b of the plunger 35. As a result, a spring force by means of the compression coil spring 34 is applied to the panel P, via the clamp jaw 22. This spring force can be adjusted to increase by displacing the position of the retreating stroke end of the plunger 35 rearwards.

At this time, an axial thrust is applied to the male screw member 41 by means of the spring force of the compression coil spring 34. However, since the lead angle between the male screw member 41 and the female screw member 47 is set to be small, the rotary motion of the female screw member 47 is transmitted only to the axial motion of the male screw member 41, and as a result, the female screw member 47 does not rotate by the axial thrust of the male screw member 41. That is, the female screw member 47 as a rotor does not rotate, even when the axial thrust acts on the male screw member 41, and rotates only when it is energized, to thereby transmit the rotary motion to the axial motion of the male screw member 41. As a result, even if energization with respect to the motor 43 is suspended, the plunger 35 is prevented from moving.

If a spring force in the retreating direction can be applied to the reciprocating shaft 27, a helical tension spring may be provided, instead of the compression coil spring 34, on the opposite side of the spring bearing member 31.

When the reciprocating shaft 27 is axially driven by the motor 43 to open/close the clamp arm 23, to thereby drive the clamp arm 23 between an unclamped position where the clamp arm 23 comes into the slit 21 and a clamped position where the clamp jaw 22 protrudes from the slit 21, there is only one condition that the clamp arm 23 comes into the slit 21, with respect to the unclamped position of the clamp arm 23. Accordingly, the range of the allowable error is large, and the range of the positioning error of the plunger 35 can be set large, and hence the positioning accuracy at the advancing stroke end of the plunger 35 need not be set high.

On the other hand, the position where the clamp jaw 22 clamps the panel P should be set with high accuracy, since if the position is away from the panel P, the panel P cannot be clamped, or if the clamp jaw 22 bites too hard, the male screw member 41 and the female screw member 47 are locked to each other. However, at the time of clamping, not only the positioning error of the plunger 35 but also the thickness of the panel P may differ, depending on the kinds of the panel, and hence it is not easy to set the position by the motor 43 with high accuracy.

Accordingly, with the present invention, the retreating stroke end of the plunger 35 is shifted rearwards than the clamping position of the clamp arm 23, that is, the retreating stroke end of the reciprocating shaft 27, to thereby clamp the panel P by means of the compression coil spring 34. As a result, the panel P can be reliably clamped by a predetermined clamping force by means of a spring, without increasing the accuracy of the stop position of the plunger 35 by means of the motor 43. In this manner, it is not necessary to set the stop position of the plunger 35 by means of the motor 43 with high accuracy, and the clamping force is obtained by a spring. As a result, it becomes possible to use a small and low-cost stepping motor 43.

In FIG. 4, assuming that the reciprocating stroke of the reciprocating shaft 27, that is, the reciprocating stroke of the clamp arm 23 is Sc and the reciprocating stroke of the plunger 35 is Sp, the retreating stroke end of the plunger 35 is shifted rearwards and the position of this retreating stroke end can be optionally adjusted. By changing the position at the retreating stroke end, the clamping force can be also adjusted.

Figure 5:
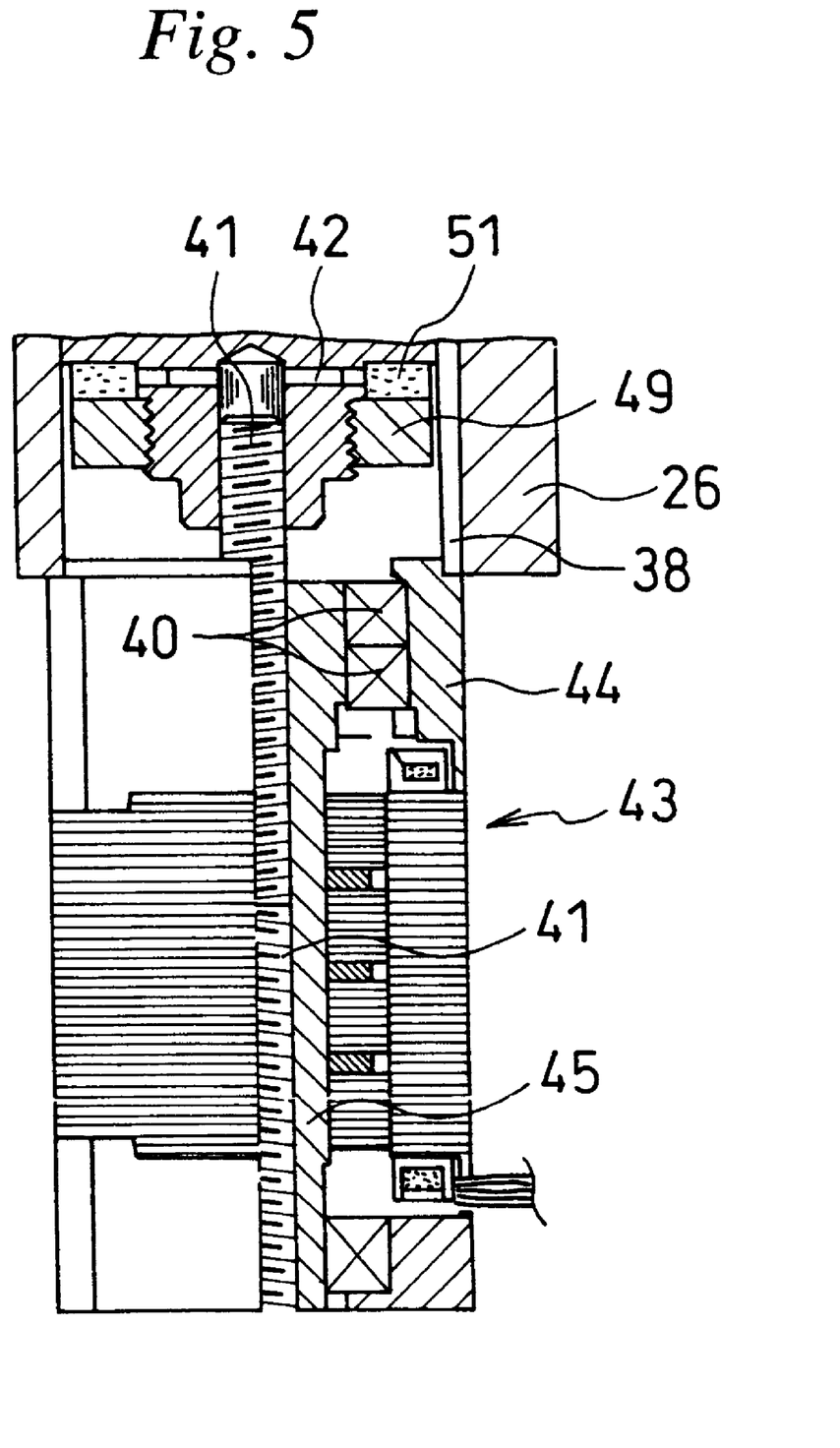
FIG. 5 is a half sectional view showing a motor portion in a positioning and clamping apparatus according to another embodiment of the present invention.

FIG. 5 is a half sectional view showing a stepping motor 43 in the positioning and clamping apparatus, which is another embodiment of the present invention. In this case, a female screw thread-connected to the male screw member 41 is formed on the inner periphery of the rotor, that is, the hollow rotation shaft 45. As a result, the above-described female screw member 47 and the rotation ring 46 are not necessary, thereby the overall length of the drive mechanism 12 can be made short. The overall shape of this motor 43 is similar to that of the motor 43 used in the above-described embodiment, except that the female screw is formed on the hollow rotation shaft 45.

The present invention is not limited to the above-described embodiments, and needless to say, various modifications are possible without departing from the scope of the present invention.

For example, the illustrated positioning and clamping apparatus is applied to position and clamp a panel, when panels for a vehicle body are welded in a production line for producing vehicle bodies. However, if a member to be fixed, such as a panel is to be clamped, it can also be used for fixing various members.

What is claimed is:

1. A positioning and clamping apparatus comprising:
    a support barrel having a supporting face formed thereon for supporting a member to be fixed and provided with a positioning pin to which a positioning hole formed on said member to be fixed is fitted;
    a clamp arm mounted in a slit formed in said positioning pin so as to be able to swing and so as to be able to move axially in an advancing/retreating direction, and having a clamp jaw provided at a tip thereof for clamping said member to be fixed between said supporting face and said clamp jaw;
    a drive housing mounted to a rear end portion of said support barrel, and having a reciprocating shaft connected to said clamp arm so as to be able to axially reciprocate;
    a spring member provided in said drive housing, for applying a spring force to said clamp arm in a retreating direction via said reciprocating shaft;
    a plunger mounted in said drive housing so as to be able to reciprocate, a brought into contact with said reciprocating shaft; and
    a motor mounted to a rear end portion of said drive housing and provided with a rotor connected in a threading manner to a male screw member secured on said plunger.

2. A positioning and clamping apparatus according to claim 1, wherein a retreating stroke end of said plunger is set to be rearward of a retreating stroke end of said reciprocating shaft.

3. A positioning and clamping apparatus according to claim 1, wherein a female screw is formed on a hollow rotation shaft provided in said motor, and said male screw member is connected to said rotation shaft in a threading manner.

4. A positioning and clamping apparatus according to claim 2, wherein a female screw is formed on a hollow rotation shaft provided in said motor, and said male screw member is connected to said rotation shaft in a threading manner.

5. A positioning and clamping apparatus according to claim 1, wherein said male screw transmits a rotating motion of said rotor in the axial direction of said male screw member, and has a lead angle such that said rotor is not rotate a by a axial thrust of said male screw member.

6. A positioning and clamping apparatus according to claim 2, wherein said male screw transmits a rotating motion of said rotor in the axial direction of said male screw member, and has a lead angle such that said rotor is not rotate a by a axial thrust of said male screw member.

7. A positioning and clamping apparatus according to claim 3, wherein said male screw transmits a rotating motion of said rotor in the axial direction of said male screw member, and has a lead angle such that said rotor is not rotate a by a axial thrust of said male screw member.

8. A positioning and clamping apparatus according to claim 4, wherein said male screw transmits a rotating motion of said rotor in the axial direction of said male screw member, and has a lead angle such that said rotor is not rotate a by a axial thrust of said male screw member.

* * * * *

UNITED STATES PATENT AND TRADEMARK OFFICE
CERTIFICATE OF CORRECTION

PATENT NO.    : 6,439,560 B2
DATED         : August 27, 2002
INVENTOR(S)   : Ken Sawada, Akio Nakata and Masakazu Tetsuka It is certified that error appears in the above-identified patent and that said Letters Patent is hereby corrected as shown below:

Column 6,
Line 51, "a" should be -- and --

Column 7,
Lines 8 and 13, "rotate a by a axial" should read -- rotated by an axial --

Column 8,
Lines 5 and 10, "rotate a by a axial" should read -- rotated by an axial --

Signed and Sealed this

Eleventh Day of February, 2003

JAMES E. ROGAN
*Director of the United States Patent and Trademark Office*